United States Patent
Nomiyama et al.

(10) Patent No.: US 7,302,646 B2
(45) Date of Patent: Nov. 27, 2007

(54) INFORMATION REARRANGEMENT METHOD, INFORMATION PROCESSING APPARATUS AND INFORMATION PROCESSING SYSTEM, AND STORAGE MEDIUM AND PROGRAM TRANSMISSION APPARATUS THEREFOR

(75) Inventors: Hiroshi Nomiyama, Kawasaki (JP); Koichi Takeda, Machida (JP); Takashi Sakairi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 10/072,532

(22) Filed: Feb. 6, 2002

(65) Prior Publication Data

US 2002/0091684 A1    Jul. 11, 2002

(51) Int. Cl.
G06F 3/00 (2006.01)
(52) U.S. Cl. .................. 715/764; 715/968; 707/102
(58) Field of Classification Search ............ 715/738, 715/733, 968, 760, 513; 707/3, 10
See application file for complete search history.

(56) References Cited

U.S. PATENT DOCUMENTS

| | | | |
|---|---|---|---|
| 5,675,788 A * | 10/1997 | Husick et al. ........... 707/104.1 |
| 5,875,446 A * | 2/1999 | Brown et al. .................. 707/3 |
| 6,289,342 B1 * | 9/2001 | Lawrence et al. ............. 707/7 |
| 6,300,947 B1 * | 10/2001 | Kanevsky .................... 715/866 |
| 6,638,317 B2 * | 10/2003 | Nakao ........................ 715/530 |
| 6,665,659 B1 * | 12/2003 | Logan .......................... 707/3 |
| 6,671,683 B2 * | 12/2003 | Kanno .......................... 707/5 |
| 2002/0138487 A1 * | 9/2002 | Weiss et al. ................. 707/10 |

* cited by examiner

*Primary Examiner*—Kieu D. Vu
(74) *Attorney, Agent, or Firm*—Richard M. Goldman

(57) ABSTRACT

An information processing system, for processing information obtained from multiple sites that are connected via the Internet 10, includes: a webcrawler 13, for crawling sites, across the Internet 10, which are registered in a registered site DB 11; a metadata DB 12, for storing metadata from which information elements are extracted from content referred to by using a URL; an important information element extraction mechanism 30, for reading information stored in the metadata DB 12, and for extracting important information elements based on the matching level of information elements; an important information element DB 40, for storing the extracted important information elements; and a result display mechanism 41, for visually presenting said stored important information elements.

8 Claims, 15 Drawing Sheets

Example registered site

```
<site>
    <url>http://www.ibm.co.jp/</url>
    <name>IBM Japan Homepage</name>
</site>
<site>
    <url>http://www.ibm.com/</url>
    <name>IBM Corporation</name>
</site>
<site>
    <url>http://www.jp.ibm.com/shop/</url>
    <name>IBM Japan, "Shopping" </name>
</site>
<site>
    <url>http://www.jp.ibm.com/developerworks/</url>
    <name>developerWorks</name>
</site>
```

Fig. 3

Example link

Expression in an HTML file

```
<a href="http://www.ibm.com/jp/software/data/udb/v7/seminar.
html">DB2 UDB V7 open free seminar</a>
```

Extracted information elements

```
<anchor>
// title of a link
<DCtitle>DB2 UDB V7 open free seminar </DCtitle>
// URL
<url>http://www.ibm.com/jp/software/data/udb/v7/seminar.html</url>
// extracted keywords
<kwds>
//        keywords        // categories of keywords
<kwd><word>DB</word><class>T0</class></kwd>
<kwd><word>UDB</word><class>T0</class></kwd>
<kwd><word>V</word><class>T0</class></kwd>
<kwd><word>seminar </word><class>13</class></kwd>
<kwd><word>open </word><class>13</class></kwd>
<kwd><word>free </word><class>13</class></kwd>
</kwds>
</anchor>
```

Fig. 5

Example text block

Expression in an HTML file industry talk / this week's e – column

Extracted information elements

```
<text>
// text portion
<DCdescription> industry talk / this week's e – column
</DCdescription>
<kwds>
<kwd><word>e</word><class>T0</class></kwd>
<kwd><word> industry </word><class>T0</class></kwd>
<kwd><word> column</word><class>11</class></kwd>
<kwd><word> talk </word><class>13</class></kwd>
<kwd><word> this week</word><class>11</class></kwd>
</kwds>
</text>
```

Display of sentence-level important information element sets (display of an index using topic keywords)

IBM information

| Topic keywords | Announced (4) | IBM (3) | President (2) | Software (2) |

12/08
- ⟨2⟩ Announced software for constructing the e-marketplace
- ⟨2⟩ Joint development with company A for MRAM technique

12/07  ~ 65
- ⟨4⟩ IBM Japan ranked second through environmental management research - canvassed by GHI news agency -
- ⟨2⟩ Announced new model "Aptiva X series" of liquid crystal integration type (12/6)
- ⟨2⟩ Company B announced API that permits Java and XML to interact with each other (12/4, CNJ)
- ⟨2⟩ Notification of the opening of a lobby area at the operating office of IBM
- ⟨2⟩ IBM, ranked top by database comparison performed by InfoWorld (12/5)
- ⟨2⟩ President's report (23) - from junior blue forum (1)

12/06
- ⟨4⟩ Speech by president Otoshi - Fujisawa town meeting (2000/11/29) (12/4)
- ⟨2⟩ IBM software product received the writers choice award for Java Report in five departments
- ⟨2⟩ Announced new entry model of IntelliStation (12/5)

Display by designating topic keywords

| Topic keywords | Announced (4) | IBM (3) | Japan (2) | Software (2) |

12/08
12/07

▼ ⟨2⟩ President's report (23) — from junior blue forum (1)

12/07 ★ President report (23) "But much value on it even though it may have happened casually" [IBM Japan]
12/07 ★ President's report (23) — from junior blue forum (1) — [Tokyo Research Laboratory]

▼ ⟨4⟩ Speech by president Otoshi — Fujisawa town meeting (2000/11/29) (12/4)

12/06 ★ Speech of president Otoshi — Fujisawa town meeting (2000/11/29) (12/4) [Yamato Software Laboratory]
12/05 ★ Q. & A. to president Otoshi — Fujisawa town meeting (2000/11/29) [IBM Japan]
12/05 ★ Fujisawa town meeting (2000/11/29) [Tokyo Research Laboratory]
12/05 ★ Speech by president Otoshi — Fujisawa town meeting (2000/11/29) [IBM Japan]

Fig. 12

INFORMATION REARRANGEMENT METHOD, INFORMATION PROCESSING APPARATUS AND INFORMATION PROCESSING SYSTEM, AND STORAGE MEDIUM AND PROGRAM TRANSMISSION APPARATUS THEREFOR

TECHNICAL FIELD

The present invention relates to searches made of information sources, and in particular to a method for extracting and visually presenting important information stored at a plurality of information sources on the Internet.

BACKGROUND OF THE INVENTION

Recently, concurrent with the development of services on the Internet, an enormous amount of information has become available to users. Thus, it has become ever more important that a search technique be developed whereby information desired by users can be extracted from the huge reservoir of presently available data, and that the information be rearranged as quickly and accurately as possible, employing a form that users find easy to handle.

A conventional technique that takes site references into account is disclosed in reference 1 ("Authoritative Sources In A Hyperlinked Environment", J. Kleinberg, Proc. 9th ACM-SIAM Symposium on Discrete Algorithms; also mentioned in IBM Research Report RJ 10076, May 1997). According to this technique, an importance level is calculated while taking into account a reference relation (support) on a static structure at a specific moment on the Internet. In this case, a page (Authority) authorized relative to a designated search form, and a page (Hub) including many authorized pages are extracted. Another technique takes site references into account at the word level; for example, topic words are extracted for which clustering is performed, and articles are displayed that are related to individual clusters that are so obtained.

There is also a technique, featuring annotations of web pages, whereby database searches are performed by using, as keys, words that appear on web pages, and whereby references for information or for services are provided. At portals, sites for providing search facilities and information services, such as for news, employ keyword ranking, for example, that corresponds to topics selected by searchers to provide, for users, topic keywords that are manually prepared and are currently popular.

As is described above, the automatic extraction and rearranging of relevant data concerning current topics, so that they can be readily displayed and referenced, is very useful, and for this purpose, several conventional proposals are presently available. But according to the conventional techniques, rather than being automatic, the collection and preparation of information are manual processes, and the referencing provided for information or for services is performed based purely on words; referencing based on facts (sentences) is not satisfactorily performed. For example, annotations for individual words or word sets, such as "A company", "Linux" and "personal computer", can be provided for such text as, "A company announced the Autumn model of a personal computer running Linux"; however, no annotation can be provided concerning the facts contained in the text.

Further, on the Internet, there are many sites, such as news sites and technical information sites, that provide and transmit high-quality information, but the information transmitted by each site differs in the range covered, the amount and quality of the available information, and the information selection references, nor can satisfactory objective information always be obtained by sampling the data available at a single site. It is possible that information (a set of information elements that appeared in the site since a specific time) that newly arrived at the site can be collected by periodically crawling registered URLs; however, when multiple sites are registered, the total amount of information available at these sites is overwhelming, and it would be difficult to read all the information within a short time. For example, when 20 IT related sites are registered as crawling destinations, in four days the total newly arrived links could amount to about 800 cases, and the volume of information could become so huge that a user could not easily read it all.

To resolve this problem, methods can be adopted by which importance levels, used to define specific references, can be implemented by employing weighting for individual information elements, and for accordingly establishing differences between display methods that will facilitate the identification of relevant information. As one method, anchor (link) information (a URL and its title) and a text block are obtained from sites for various display forms, and are standardized, so that the handling of information obtained from multiple sites is uniform. However, merely by the standardization of information, since rendering information, such as font sizes and display positions, is removed at individual sites, importance levels can not be determined from the rendering information that is generally employed.

The method used for visually representing importance levels is one that is easily understood by human beings; however, since various descriptive methods are available for HTML, it is not easy for the importance levels of information elements to be automatically calculated. Further, even when importance levels can be calculated, evaluation references can be applied only for specific, pertinent sites, and in general have only limited applicability. Especially, information, such as advertisements and special notices, tends to be displayed at prominent locations at individual sites, and is important only for those sites. Therefore, it would be difficult that generally important information is extracted by referring to the information at a single site.

Additionally, a method may be employed by which information is judged by its timeliness rather than its importance level. However, the immediate topicality of such information does not always match the importance level of the information.

Further, when information elements can be identified that convey the same information, their importance levels can be calculated by examining them to determine whether they are employed by multiple sites, but it is difficult to extract elements that convey the same facts. The simplest method is one by a determination is made as to whether the character strings of the titles of the elements resemble each other. However, many variations are used to represent sentences that convey the same facts, and depending on a decision made merely as to whether character strings match is not always a satisfactory solution. For example, for expressions such as "in this year, November, the following November", or "a notebook PC, a B5 notebook, a PC" there are many variations, even though the intent is to express the same facts and the same concepts, so that a determination that is based only on whether information element character strings match is not appropriate for the extraction of information elements that convey the same facts.

In addition, depending on the type of site referred to, there may be few or no information elements that convey the same facts. In this case, since a set of important information elements can not be extracted, increased efficiency in the acquisition of information is not possible. But although the concept is not as strictly limited as is the extraction of sets of important information elements, if important articles can be procured by using a filter and selecting a group of sites whereat the content matches the taste of a user, instead of concentrating on newly available information, this would be a useful user service.

The extracted important information elements can be used for generating a summary of a group of sites, and can be also applied for a single site. Especially, when instead of one group of sites an arbitrary number of groups of sites are employed, important information elements extracted in accordance with various preferences can be displayed. Further, when the latest important information is provided as annotation while various on-line documents are being referred to, this would be very valuable. For example, when the latest information about ThinkPad (IBM trademark), such as, "2000 Oct. 18 Announced an office-use notebook PC 'ThinkPad21' having an enhanced function", is dynamically provided while an old article about the machine is being referred to, this would be very useful for a user.

To resolve the above described conventional technical problems, it is one object of the present invention to provide a user valuable information while multiple information sources that experience dynamic changes are periodically observed.

It is another object of the invention to extract elements that convey the same facts, or sets of important words that are referred to on multiple sites, and to visually present these elements, so that information in an easily identified form can be provided for users.

SUMMARY OF THE INVENTION

To achieve the above objects, according to the present invention, multiple information sources (referred to by, for example, URLs) that are obtained on the Internet or another network and are dynamically changed are periodically observed, and from among the information elements, such as new anchors (links) or text, that are extracted from these information sources, information elements that include the same facts that are referred to on multiple sites or that include a set of important words are extracted and are presented visually. Specifically, according to the present invention, an information rearrangement method for rearranging information obtained from information sources connected via a network comprises: an information collection step of collecting information from a predetermined number of registered sites; an information element extraction step of extracting, from among the collected information, information elements that include the same facts that are referred to at multiple sites; and a display step of displaying the contents of the extracted information elements while changing the display state of the contents in accordance with the number of sites whereat the facts are referred to.

At the information element extraction step, the information elements that convey the same facts are extracted together with a set of keywords that represent the information elements. This extraction method can be a method for selecting, from the keywords of the information elements included in one set, a keyword having an appearance rate that is equal to or greater than a threshold value. These keywords can be words that are effective for determining the same facts that are included in the information elements, such as new anchors (links) or text, and nouns, such as predetermined proper nouns; these words can be also verbs.

At the display step, a set of important information elements on a sentence level are extracted from a group composed of a predetermined number of sites, and the display for the same sets of important information elements is folded. This arrangement is preferable because the display area for relevant articles can be reduced, and the usability for user's selection can be increased.

According to the present invention, an information rearrangement method comprises: a topic keyword extraction step of extracting a topic keyword that represents the entire set of information elements to be extracted; and a display step of displaying the contents of the extracted information elements, while displaying the extracted topic keyword at a position different from the contents concerning the information elements. For example, only a topic keyword including multiple items is arranged on the upper portion in the display area so that the user can easily see it.

At the display step, when specific items are designated in the displayed topic keyword including multiple items, the contents concerning information elements that belong to a set of the specific items are displayed, and the contents concerning information elements that belong to a set of items that are not pertinent to the specific items are masked. For example, only the headlines that include the selected topic keyword are displayed; those headlines that do not include the topic keyword are not displayed. This configuration is excellent because information that excludes unnecessary data can be provided for a user.

From another viewpoint of the invention, an information rearrangement method comprises: an information collection step of periodically crawling a group of registered sites and collecting information; an information element extraction step of extracting, from among a set of information elements at the individual sites in the group, information elements that convey the same facts; and an importance level calculation step of providing an importance level in accordance with the number of sites that are referred to. The information rearrangement method can be performed by a client PC that receives information from the site, by a proxy server, or by a site manager who manages content.

At the information element extraction step, from new keywords that are revised by periodical crawling, the information elements that include the same facts are extracted while taking into account a matching level relative to a proper noun that can be the subject of the facts.

Further, important information elements on the sentence level, for which an importance level is provided at the importance level calculation step, are rearranged in the descending order of their importance levels and are presented visually. This arrangement is preferable because the attention of a user will first be drawn to the information having the highest importance level.

According to the present invention, an information rearrangement method comprises the steps of: extracting information elements from multiple sites; determining whether, of the information elements extracted from the multiple sites, there are relevant information elements that convey the same facts as sentence-level information elements that constitute an arbitrary web page; and when the relevant information elements that include the same facts as the sentence-level information elements are present in the information elements obtained from the multiple sites, adding remark information to the sentence-level information elements to provide information concerning the arbitrary web page. The remark information is added by a content manager or a proxy server.

The web page with the added remark information is displayed, and the relevant information elements are displayed by designating the remark information. Then, when the user needs that information, the folded information for a relevant site can be displayed.

Furthermore, according to the invention, an information rearrangement method comprises the steps of: registering sites that are the favorites of users; periodically crawling the registered sites; registering data whose contents have been revised; extracting, from the registered data, new keywords relative to information elements; calculating important keywords from the extracted keywords; extracting a set of sentence-level important information elements based on the matching level of the obtained important keywords; and extracting a topic keyword based on a set of keywords that are provided for each of the sentence-level important information elements in the extracted set.

From the important keywords, word-level important information elements are extracted that are ascertained to be important according to a determination reference as to whether an information element includes many words referred to at multiple sites.

An information processing apparatus for rearranging information obtained from information sources connected via a network comprises: information collection means for collecting information from a predetermined number of registered sites; information element extraction means for extracting, from among the collected information, information elements that include the same facts that are referred to at multiple sites; and result display means for displaying the contents of the extracted information elements while changing the display state of the contents in accordance with the number of sites whereat the facts are referred to.

The result display means rearranges the information elements in the descending order of the numbers of sites that are referred to, and displays the contents of the information elements. The user can then examine the information elements in the descending order of their importance level. The result display means displays sets of sentence-level important information elements that are extracted from a group of a predetermined number of sites, and folds and hides the same important information element sets. With this arrangement, for example, the information obtained from a relevant site can be displayed as needed, and in other cases, the information can be compressed and displayed.

An information processing apparatus for rearranging information obtained from information sources connected via a network comprises: information collection means for collecting information from a predetermined number of registered sites; information element extraction means for extracting, from among the collected information, information elements that include the same facts that are referred to at multiple sites; topic keyword extraction means for extracting a topic keyword that represents the entire set of information elements to be extracted; display means for displaying the contents of the extracted information elements, while displaying the extracted topic keyword at a position different from the contents concerning the information elements, and for, when specific items are designated in the displayed topic keyword including multiple items, displaying the contents concerning information elements that belong to a set of the specific items, and masking the contents concerning information elements that belong to a set of items that are not pertinent to the specific items.

An information processing apparatus comprises: information collection means for periodically crawling a group of registered sites and collecting information; information element extraction means for extracting, from among a set of information elements at the individual sites in the group, information elements that convey the same facts, and for extracting, from new keywords that are revised by periodical crawling, the information elements that include the same facts, while taking into account a matching level relative to a proper noun that can be the subject of the facts; and importance level calculation means for providing an importance level in accordance with the number of sites that are referred to.

An information processing apparatus comprises: means for extracting information elements from multiple sites; means for determining whether, of the information elements extracted from the multiple sites, there are relevant information elements that convey the same facts as sentence-level information elements that constitute an arbitrary web page; means for, when the relevant information elements that include the same facts as the sentence-level information elements are present in the information elements obtained from the multiple sites, adding remark information to the sentence-level information elements to provide information concerning the arbitrary web page; means for displaying the web page with the added remark information; and means for displaying the relevant information elements are displayed by designating the remark information.

Furthermore, according to the invention, an information processing system, for processing information obtained from multiple sites that are connected via a network, comprises: a webcrawler, for crawling registered sites across a network; a metadata DB (database), for storing metadata from which information elements are extracted from content referred to by using a URL; an important information element extraction mechanism, for reading information stored in the metadata DB, and for extracting important information elements based on the matching level of information elements; an important information element DB, for storing the extracted important information elements; and a result display mechanism, for visually presenting the stored important information elements, wherein the important information element extraction mechanism includes a keyword importance level calculation mechanism, for employing new keywords to calculate an importance level for each keyword, and a sentence-level important information element extraction mechanism, for extracting, from a set of information elements that are calculated and sorted in the order of their importance level, important information elements at a sentence level based on the matching level as is related to facts.

In addition, the invention is applied for a storage medium on which a computer-readable program is stored on a program transmission apparatus that comprises storage means for storing the computer-readable program and transmission means for transmitting the program stored in the storage means. This computer-readable program permits a computer to perform: a process for collecting information from a predetermined number of registered sites; a process for extracting, from among the collected information, information elements that include the same facts that are referred to at multiple sites; and a process for displaying the contents of the extracted information elements while changing the display state of the contents in accordance with the number of sites whereat the facts are referred to. Another program permits a computer to perform: a process for extracting a topic keyword that represents the entire set of information elements to be extracted; and a process for displaying the contents of the extracted information elements, while displaying the extracted topic keyword at a position different from the contents concerning the information elements.

An additional program permits a computer to perform: a process for periodically crawling a group of registered sites and collecting information; a process for extracting, from among a set of information elements at the individual sites in the group, information elements that convey the same facts; and a process for providing an importance level in accordance with the number of sites that are referred to.

A further program permits a computer to perform: a process for extracting information elements from multiple sites; a process for determining whether, of the information elements extracted from the multiple sites, there are relevant information elements that convey the same facts as sentence-level information elements that constitute an arbitrary web page; and a process for, when the relevant information elements that include the same facts as the sentence-level information elements are present in the information elements obtained from the multiple sites, adding remark information to the sentence-level information elements to provide information concerning the arbitrary web page.

In addition, yet another program permits a computer to perform: a process for registering sites that are the favorites of users; a process for periodically crawling the registered sites, and registering data whose contents have been revised; a process for extracting, from the registered data, new keywords relative to information elements; a process for calculating important keywords from the extracted keywords; a process for extracting a set of sentence-level important information elements based on the matching level of the obtained important keywords; and a process for extracting a topic keyword based on a set of keywords that are provided for each of the sentence-level important information elements in the extracted set.

BRIEF DESCRIPTION OF THE DRAWINGS

FIG. 3 is a diagram showing an example site registered in a registered site DB 11.

FIG. 5 is a diagram showing an example link for example prepared metadata.

FIG. 6 is a diagram showing an example text block for example prepared metadata.

FIG. 11 is a diagram showing an example display for sets of sentence-level important information elements to which an index (topic keywords) 65 has been added.

FIG. 12 is a diagram showing an example display when an item is selected from the topic keywords 65.

DETAILED DESCRIPTION OF THE INVENTION

The preferred embodiment of the present invention will now be described in detail while referring to the accompanying drawings.

First, in order to easily understand the technique of the invention, an overview will be presented of the processing for which the invention is applied.

Figure 1:
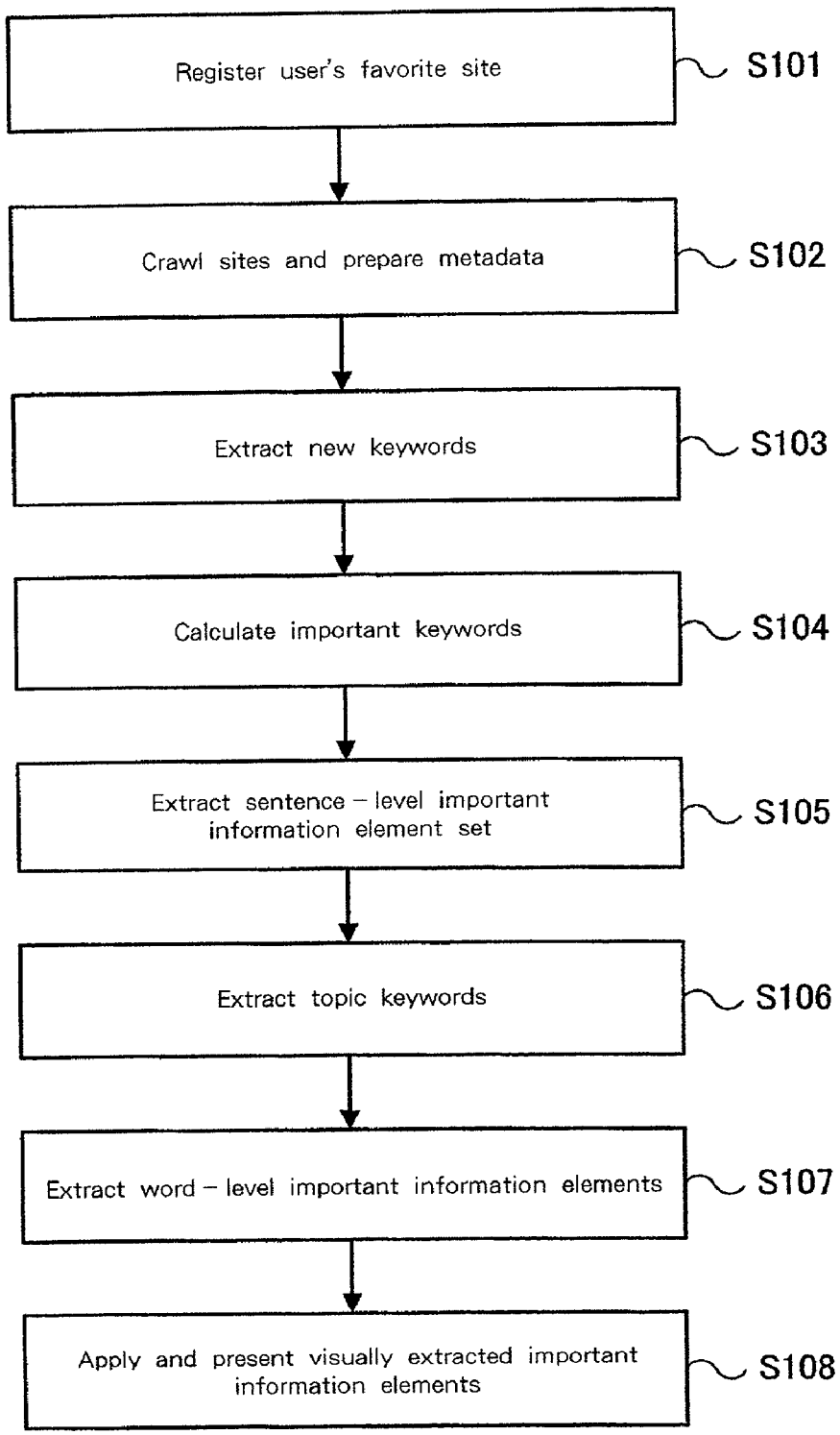
FIG. 1 is a diagram showing an overview of an important information element extraction process for an embodiment of the present invention.

FIG. 1 is a diagram showing an overview of an important information element extraction process according to the embodiment. This method is provided on the premise there is a basic mechanism whereby an individual can freely select an information source and rearrange information by freely providing an importance level in accordance with how much he or she is interested in the information, and automatically implements his or her own information site (Personal Portal), or a site for a specific field (Vertical Portal). And depending on whether the information elements extracted by this mechanism are referred to at multiple sites, the importance level is provided based on two viewpoints: (1) information elements (a set of sentence-level important information elements) that transmit the same information are extracted, and (2) topic keywords are extracted, so that the information can be presented visually.

In this processing, first, a site that is the favorite of a user is registered (step 101). For this registration, for example, the name and the reference (URL: Uniform Resource Locator) of the site are designated. Then, a system periodically crawls the registered sites at a designated time, and compares the contents with those stored in a database. When the contents differ, they are registered as a new version, and metadata are prepared (step 102) This metadata is obtained by extracting, from the contents referred to by a URL, elements that convey information, and consists of a link and a text portion, or continuous text portions.

At each registered site, keywords that have appeared in a version during a designated period and a preceding period are counted, and new words (keywords) are extracted by weighting a set of keywords (step 103). Thereafter, important keywords are calculated by using the sum of the ratios of new words to the keywords (step 104). Then, the importance level obtained from a corresponding keyword is defined as the importance level of an information element, and the information elements are sorted in the order of their importance levels. Thereafter, a set of information elements (a set of sentence-level important information elements) that convey the same facts are extracted from the information element sets at the individual sites (step 105), and the importance level is provided in accordance with the number of sites that are referred to. Then, in order to extract the information elements that convey the same facts, a keyword having a category that is extracted from the text portion of the information element is used, and whether a proper noun is included is important for determining whether the information elements include the same facts.

A set of keywords (representative keywords) are extracted from the individual sentence-level important information elements that are extracted. Then, a keyword (topic keyword) that is representative of the entire set of information elements is extracted from the representative keywords (step 106). The importance levels can be determined by using the number of important information element sets that appear and the ratio of the arrival of new keywords. Further, a determination reference as to whether many words are referred to at multiple sites is employed to extract the information elements that are assumed to be important (word-level important information elements) (step 107). The important information elements extracted at the individual steps are applied to a group of sites or a single site, and are presented visually (step 108). When the information elements are applied for a single site, they are identified and presented visually by changing a group of sites into an arbitrary group. By using the above described important information element extraction method, a user can extract important information from a mass of data and read it.

An explanation will be given for the configuration for the extraction of important information elements according to the embodiment.

Figure 2:
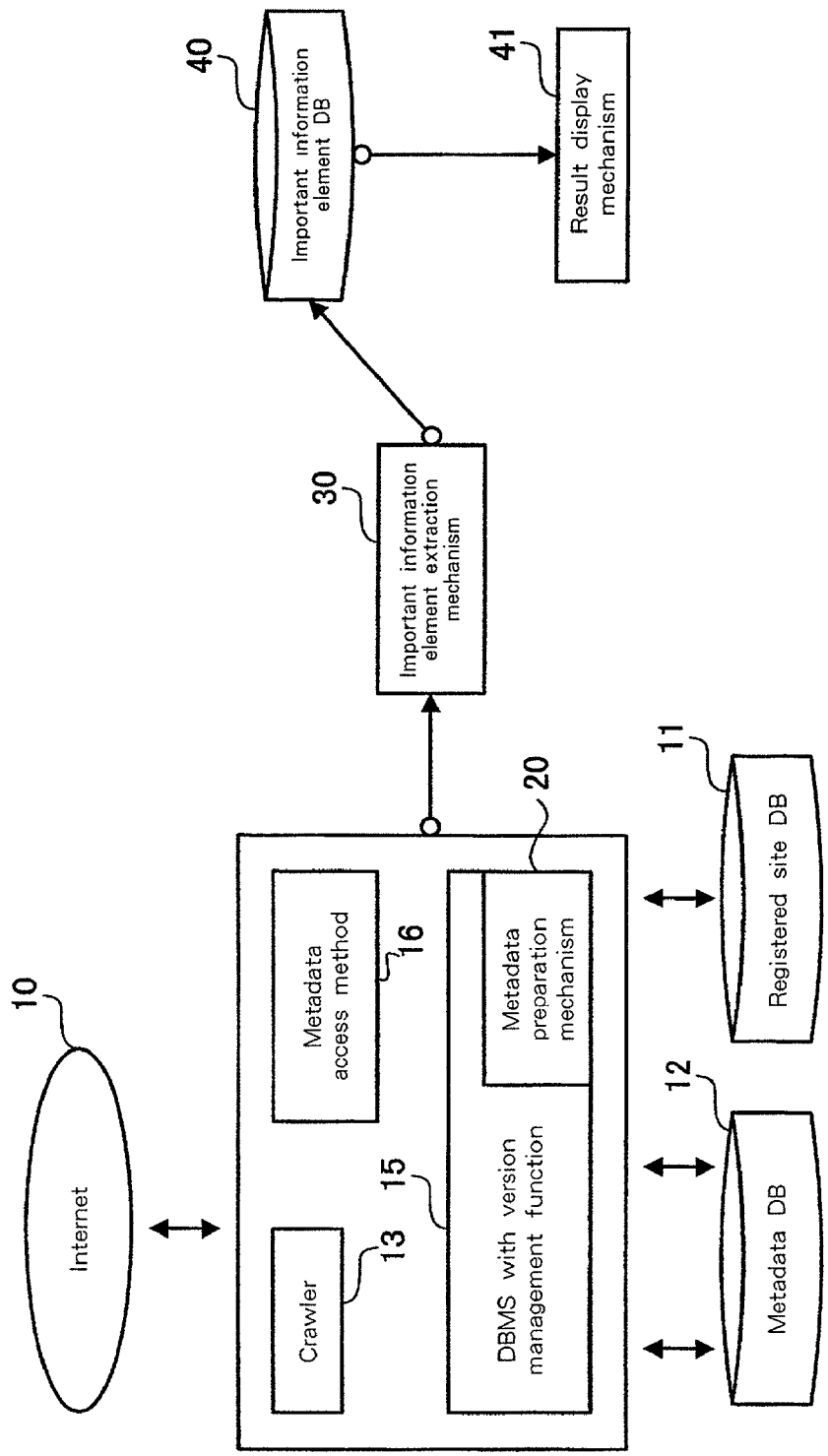
FIG. 2 is a diagram for explaining the general configuration of a system according to the embodiment.

FIG. 2 is a diagram for explaining the overall configuration of a system according to the embodiment. This system is executed as an application software processing program by a personal computer (PC) that is to be connected to the Internet 10. Further, this system can be constituted as a server for providing information for a user's PC terminal that is also connected to the Internet 10. The output by the processing program is displayed by the user's terminal on a display device, or is provided for the user's PC terminal via the Internet 10 when this system serves as a server. In the explanation for this embodiment, the processing performed by the user's PC terminal is mainly employed.

Generally, the processing program that the system executes is stored on a hard disk drive (not shown), and at the time of execution is loaded into a main memory (not shown) and processed by a CPU (not shown). The processing program may be supplied to the user's PC terminal via a storage medium, such as a CD-ROM (not shown), or may be provided for a user by being downloaded via the Internet 10.

The system in FIG. 2 comprises a registered site DB 11, which is a database for the storage of sites that the user registers, and a metadata DB 12, which is a database for the storage of metadata whereby elements conveying information are extracted from the contents that are referred to by using a URL. A processing mechanism includes a crawler 13, for automatically crawling to the registered sites via the Internet 10; and a DBMS (Database Management System) 15, which performs a version management function for the storage and management of the metadata for the registered sites. The DBMS 15, which performs the version management function, includes: a metadata preparation mechanism 20, for extracting an HTML (Hypertext Markup Language) information element, analyzing the text portion of the information element and storing a keyword included in the text and its category; a metadata access method 16, for providing means for accessing data stored in the metadata DB 12; and an important information element extraction mechanism 30, for reading data from the metadata DB 12 and for performing the calculation of an important keyword, for extracting a set of sentence-level important information elements, for extracting a topic keyword, and for extracting word-level important information elements. The contents extracted by the important information element extraction mechanism 30 are stored in an important information element DB 40. These results are presented visually by a result display mechanism 41.

The sites are registered in the registered site DB 11 in accordance with the users preferences, and to register a favorite site in the registered site DB 11, the user must designate a name and a reference (URL) for the site.

FIG. 3 is a diagram showing example sites registered in the registered site DB 11. In this example, four sites are registered in the XML (Extensible Markup Language) form. A method for registering a directory list, for example, in a specific portal site by cutting and pasting is an easy user performed operation.

At a designated time, such as at seven thirty every morning, the crawler 13 periodically crawls to the sites registered in the registered site DB 11. The same time may be designated for crawling to all the sites, or different times may be designated for individual sites. When during the crawls of the crawler 13 contents are found that differ from those that are on hand, the DBMS 15 having the version management function manages the contents as a new version, and the metadata preparation mechanism 20 prepares the metadata for the new version and stores this data in the metadata DB 12. As is described here, when a new version for a site is prepared, the metadata for the version is created. The metadata is the data obtained by extracting the elements that convey information from the contents that are referred to by the URL. The metadata consist of a link and its text portion, or a continuous text portion. An attribute extraction process is also for the text portions of the information elements, and keywords and their categories are extracted.

Figure 4:
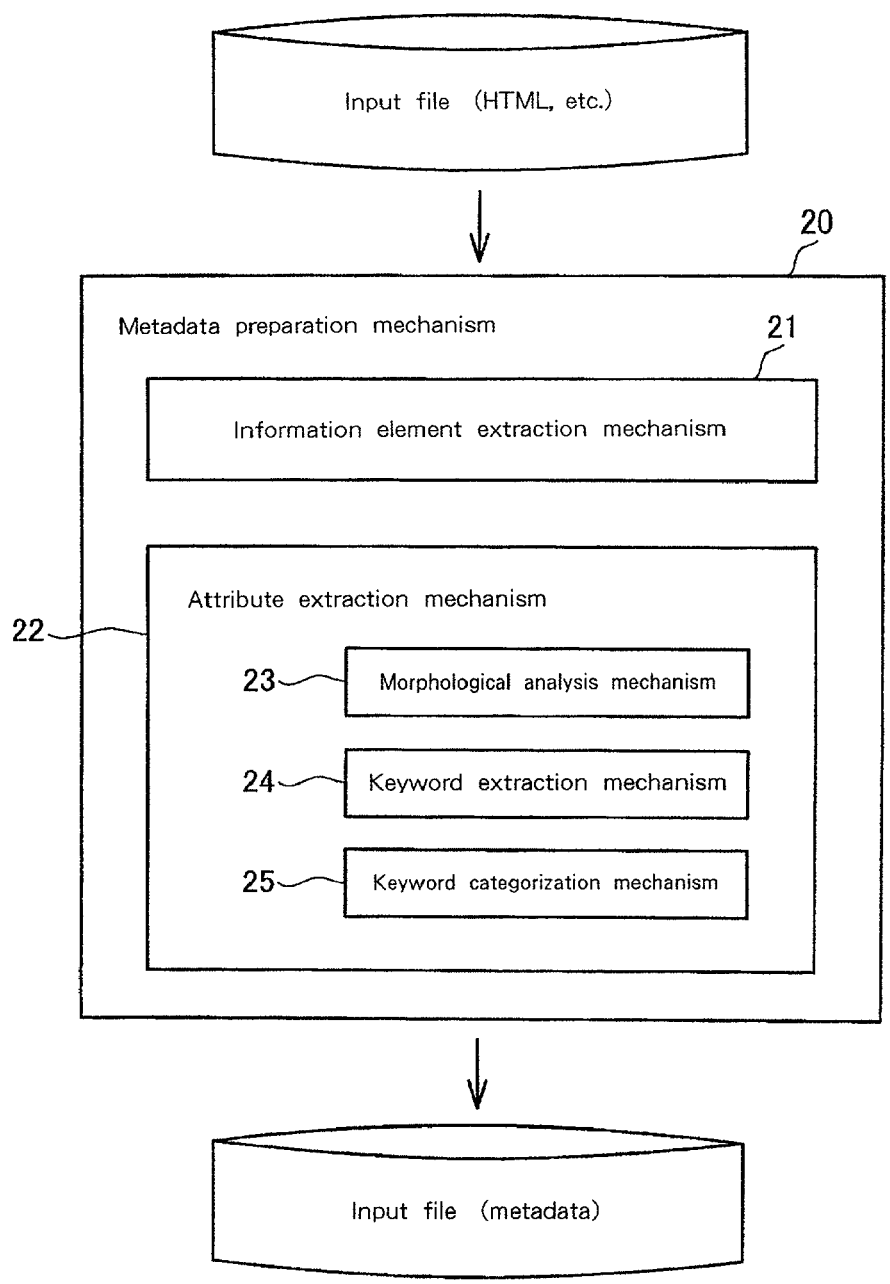
FIG. 4 is a more detailed diagram showing the arrangement of a metadata preparation mechanism 20.

FIG. 4 is a detailed diagram showing the configuration of the metadata preparation mechanism 20. In this configuration, metadata is prepared from an input HTML file, and is used as an output file. As is shown in FIG. 4, the metadata preparation mechanism 20 comprises: an information element extraction mechanism 21, for analyzing the HTML contents and extracting information elements (a link and text); and an attribute extraction mechanism 22, for extracting keywords from the text of the information elements extracted by the information element extraction mechanism 21 and for providing categories for the keywords. The attribute extraction mechanism 22 includes a morphological analysis mechanism 23, a keyword extraction mechanism 24 and a keyword categorization mechanism 25. The morphological analysis mechanism 23 divides, into words, the text portion of an information element extracted by the information element extraction mechanism 21. The keyword extraction mechanism 24 extracts only keywords from the words obtained by the morphological analysis mechanism 23. The keyword categorization mechanism 25 provides the categories for the keywords extracted by the keyword extraction mechanism 24.

FIG. 5 is a diagram showing a link as example metadata, and FIG. 6 is a diagram showing a text block as example metadata. In FIG. 5, the HTML file in the link example is represented using tags "a" that indicate the link destination, and the extracted information element is constituted by using anchor tags. In FIG. 6, the HTML file for the text block is represented by a text expression, and the extracted information element is constituted by using text tags.

In the above processing, when the contents are changed while the crawler 13 is crawling to the sites registered in the site DB 11, all the contents and the metadata that are prepared by the metadata preparation mechanism 20, in accordance with content alterations, are registered in the metadata DB 12. Further, the date on which the contents were changed (the updated date if it is obtained from the web server, or the date of crawl when the updated date can not be obtained) is also stored in the metadata DB 12.

An explanation will now be given for the important information element extraction mechanism 30 that is the most characteristic arrangement employed for the embodiment.

Figure 7:
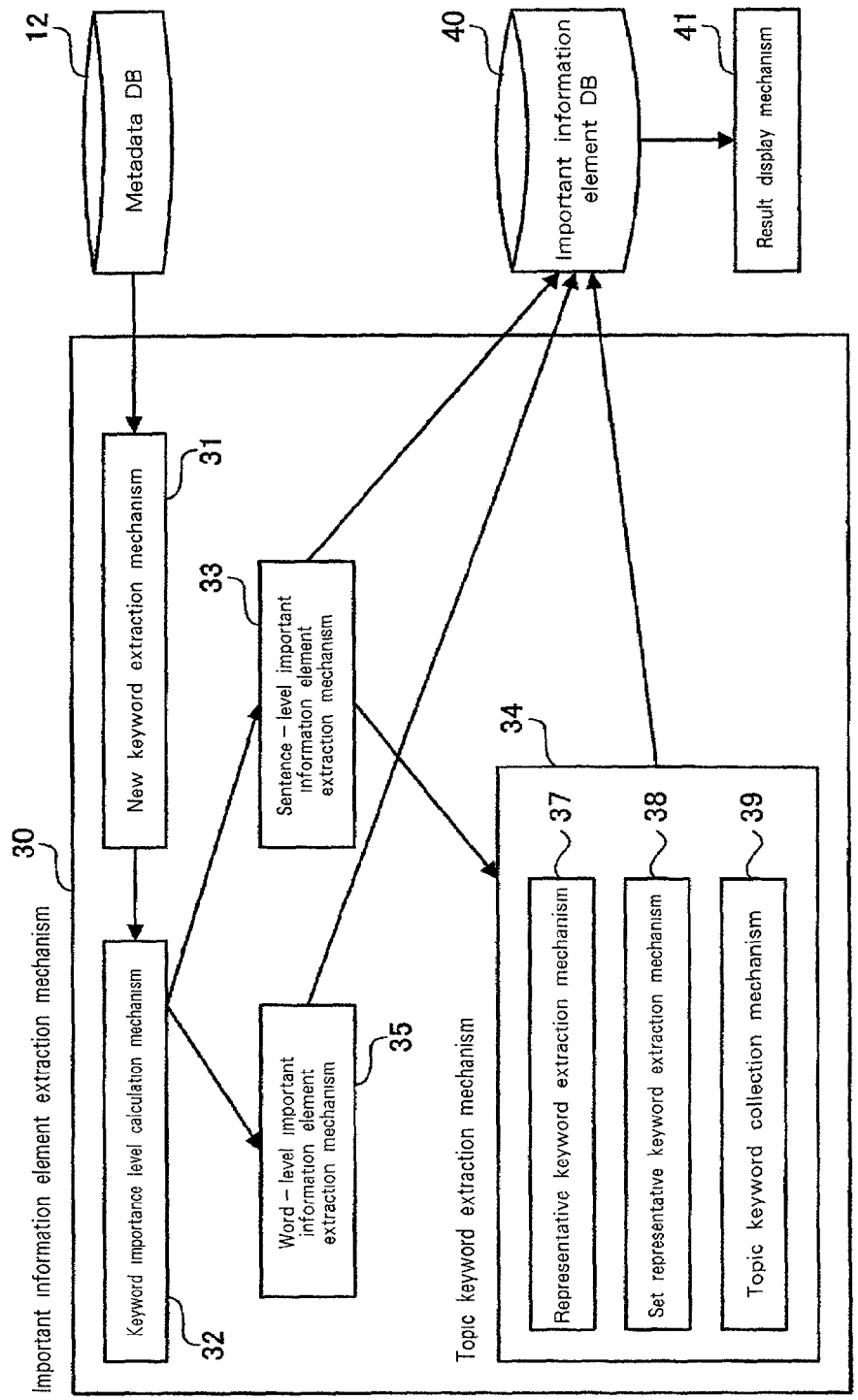
FIG. 7 is a diagram for explaining the arrangement of an important information element extraction mechanism 30.

FIG. 7 is a diagram for explaining the arrangement of the important information element extraction mechanism 30. The important information element extraction mechanism 30 for this embodiment comprises: a new keyword extraction mechanism 31, for extracting new keywords based on the keywords for the metadata stored in the metadata DB 12; a keyword importance level calculation mechanism 32, for calculating an important keyword; a sentence-level important information element extraction mechanism 33, for calculating a set of sentence-level important information elements as the clustering results; a topic keyword extraction mechanism 34, for extracting, from the entire set of important information elements extracted by the sentence-level important information elements extraction mechanism 33, a topic keyword that is assumed to be important; and a word-level important information element extraction mechanism 35, for extracting information elements in which a combination of keywords that are obtained by the keyword importance level calculation mechanism 32 frequently appear.

The topic keyword extraction mechanism 34 includes a representative keyword extraction mechanism 37, a set representative keyword extraction mechanism 38, and a topic keyword collection mechanism 39. The results extracted by the sentence-level important information element extraction mechanism 33, the topic keyword extraction mechanism 34 and the word-level important information element extraction mechanism 35 are stored in the important information element DB 40.

First, the new keyword extraction mechanism 31 performs a new keyword extraction process at step 103 in FIG. 1. During this process, keywords that are included in information elements that have newly appeared in the version during a designated period, and keywords that are included in the information elements included in the version immediately before the designated period are counted in the metadata that are obtained for a designated site from the metadata DB 12. In the process for determining whether an information element has newly appeared, when the information element is a link, whether a new link has appeared is determined when a link having a different URL appears or when, while the same URL is currently present, corresponding text differs. When the information element is a text block, whether a new text block has appeared is determined when different text appears.

Figure 8:
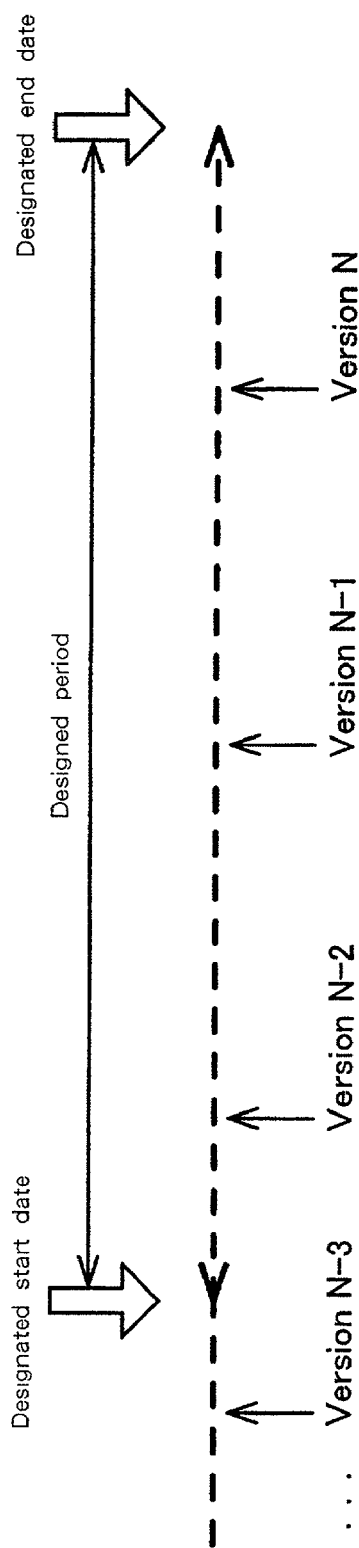
FIG. 8 is a diagram showing the relationship between a designated period and a version.

FIG. 8 is a diagram showing the relationship between a designated period and a version. For the individual sites in the site group registered in the site DB 11, the new keyword extraction mechanism 31 in FIG. 7 counts the keywords that appear in a version immediately before the designated period in FIG. 8, and in the version in the designated period. In this example, on the designated start date, the count (Fs(w)) included in the preceding version (Version N-3) is distinguished from the count (Fn(w)) included in the succeeding versions (Version N-2 to Version N).

From among these keywords, the keyword having an Fn(w)>1 is selected for a general noun, and the keyword having an Fn(w)>0 is included for a proper noun. When as the result of the analysis an unknown word is obtained, it is regarded as a proper noun. Adjectives, numerals, adverbs and pertinent words are not included. Further, the ratio (Fn(w)/(Fs(w)+Fn(w))) of new words is taken into account, and when this ratio is very low, the keyword is not regarded as important.

Then, the keyword importance level calculation mechanism 32 performs the important keyword calculation process at step 104 in FIG. 1. In this process, only keywords selected by the new keyword extraction mechanism 31 correspond to the individual information elements. At this time, the information elements that do not include the keyword selected by the new keyword extraction mechanism 31 are not targeted for calculation. Thereafter, the importance level obtained for a keyword is provided as the importance level of a corresponding information element. For this process, the total of the ratios of the new word relative to the individual keywords can be employed. Then, the information elements are sorted in the order of their importance levels.

The sentence-level important information element extraction mechanism 33 performs a process at step 105 in FIG. 1 for extracting a set of sentence-level important information elements. During this process, first, a check is performed to determine whether information elements having a keyword, which are sorted in the order of the importance levels obtained by the keyword importance level calculation mechanism 32, are matched. This determination is performed by using the matching level of a set of keywords that are provided for the information elements. Basically, a general clustering method can be employed; however, as in this embodiment, the following distinction is required to determine the matching level as it is related to facts.

(a) The matching level when proper nouns, such as the names of persons, organizations or products, that can be the subject of a fact are matched, is increased.

(b) In order to form a fact (who, what and how), only an information element that includes at least three keywords is taken into account (an information element having only two keywords can be a target when its matching level is high).

The following references are defined for the matching level.

A threshold value is defined for each reference.

Complete match

Case of the same keyword sets
  High match

Proper nouns are matched, and other keywords are matched at a high ratio.

While proper nouns are not matched, other keywords are matched at a high ratio.
  Low match Keywords are matched at a lower ratio than the high match.
  Not matched Keywords that do not fall in the above categories.

Based on the above matching levels, basically, clustering is performed mainly for the information elements that are completely matched or highly matched. The information elements in the lower match levels form an independent cluster. When the user clearly designates a strict determination reference for the matching levels, the matching can be employed based on that reference. Then, since the strict determination reference for matching is employed, only information elements that have substantially the same expression can be extracted. Further, when the strictness of the matching reference is reduced, information elements that mean the same, even though they have different expressions can be extracted. As the clustering result, a set of sentence-level important information elements can be calculated. The number of sites that refer to each set of important information elements is employed as the importance level for the pertinent set of important information elements. An information element set that is referred to by only one site is excluded and is not regarded as an important information element set.

The topic keyword extraction mechanism 34 performs the topic keyword extraction process at step 106 in FIG. 1. The representative keyword extraction mechanism 37 of the topic keyword extraction mechanism 34 extracts a set of keywords (representative keywords) that represent the individual sets of sentence-level important information elements that are extracted by the sentence-level important information element extraction mechanism 33. The keywords of the information elements of one set are extracted by means for selecting an information element where the keyword appeared at a ratio equal or greater than a threshold value. The set representative keyword extraction mechanism 38 extracts, from the representative keywords, a keyword (topic keyword) that represents the entire information element set. For the extraction of this keyword, a representative is employed for selecting an information element for which the appearance frequency of a representative keyword of each information element set is equal to or greater than the threshold value.

That is, the number of sets of important information elements that appear and the ratio of arrivals of new keywords can be used to determine the importance level. The thus extracted topic keyword is one that is selected from among the important information elements that are referred to by multiple sites, and a keyword for a current topic can be extracted.

The topic keyword collection mechanism 39 of the topic keyword extraction mechanism 34 employs the clustering method, for example, to collect the topic keywords that appear in the information element sets that are completely the same, instead of leaving the keywords in the dispersed state. The text of the information element that includes the collected topic keywords is referred to, and information for supplementing the relationships of the topic keywords is extracted and is replaced with an expression that can be more easily understood. For example, when "company A", "notebook computer" and "release" are included as topic keywords, and when all of these words appear in the same information element set, they can be collected and assembled as a single group. Further, when the text wherein these three words appeared is company A released a new notebook computer; and
"New product": company A released a new notebook computer on December 13, through analysis,
the relationship between "notebook computer" and "release" is a subject; and
the relationship between "company A" and "release" is an object are obtained. From these relationships, three keywords can be collected, and an appropriate title, "Company A released a notebook computer", can be generated.

Figure 9:
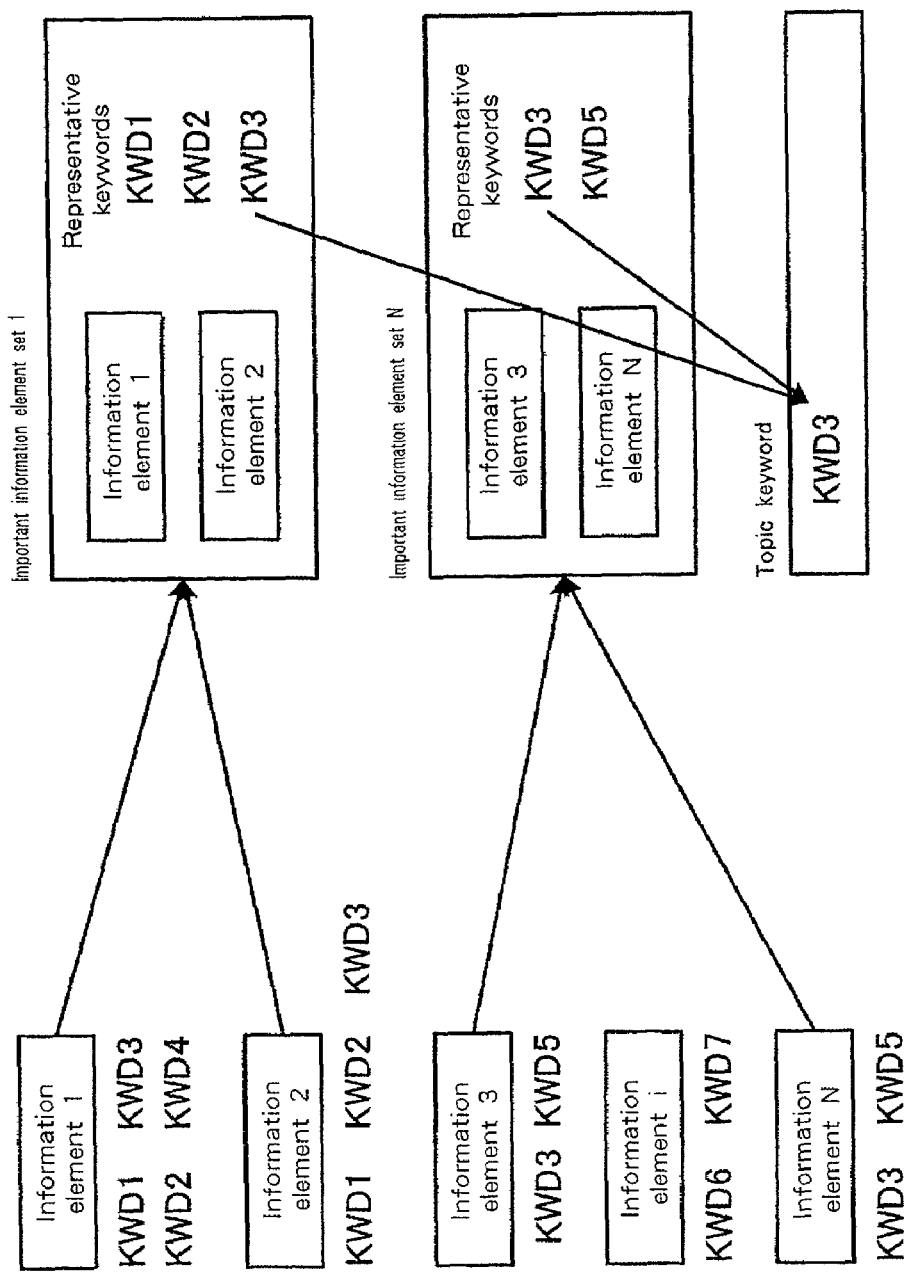
FIG. 9 is a diagram showing an example extraction process performed by a sentence-level important information element extraction mechanism 33 and a topic keyword extraction mechanism 34.

FIG. 9 is a diagram showing the extraction process performed by the sentence-level important information element extraction mechanism 33 and the topic keyword extraction mechanism 34. For example, assume that there four important keywords, KWD1, KWD2, KWD3 and KWD4, for information element 1 and three important keywords, KWD1, KWD2 and KWD3, for information element 2. The sentence-level important information element extraction mechanism 33 extracts, from among the information element sets for the individual sites, the representative keywords KWD1, KWD2 and KWD3 as a set 1 of important information elements that convey the same fact. Further, assume that important keywords for information element 3 are KWD3 and KWD5, important keywords for information element i are KWD6 and KWD7, and important keywords for information element N are KWD3 and KWD5. A keyword that is common to all the information elements is not present; however, the information element i conveys only a unique fact, and the important keywords for the information element 3 completely match those for the information element N. Therefore, the sentence-level important information element extraction mechanism 33 regards the representative keywords KWD3 and KWD5 of the information elements 3 and N as those that convey the same fact, and extracts them as the important information element set N. The topic keyword extraction mechanism 34 then extracts the topic keyword KWD3 from the important information element sets 1 and N.

The word-level important information element extraction mechanism 35 performs a process at step 107 in FIG. 1 for extracting word-level important information elements. During this process, information elements are extracted that consist of a combination of keywords that frequently appear at a group of sites. It should be noted that in this process the important information elements are only extracted, and are not collected as for the sentence-level important information element sets. The following points are considered as a matching level reference for the extraction of information elements, and a threshold value is defined.

the number of matching keywords
whether a proper noun is included
whether a keyword is referred to by multiple sites, and the number of sites that refer to the keyword or the ratio of the sites relative to the total sites. It should be noted, however, that the importance level is reduced for a keyword that is referred to by all the sites.
the degree of the ratio of a new arrival From these references, only an information element having a value that is equal to or greater than a predetermined threshold value is extracted. As well as for the important information element set, a set of representative keywords are allocated to the word-level information elements.

Finally, as is shown at step 108 in FIG. 1, the result display mechanism 41 performs a visualization process by using the important information elements that are extracted by the important information element extraction mechanism 30 and stored in the important information element DB 40. For example, to prepare an overview for a group of sites, the sets of sentence-level important information elements, which are extracted from the site sets by the sentence-level important information element extraction mechanism 33, are displayed. The important information element sets are displayed in the order, for example, of the importance level, and the displays for the same important information element sets are folded, so that a small display area can effectively be used. When the important information element set can not be extracted, the important information elements on the word level are extracted and displayed. If the word-level important information elements can not be extracted, only the latest information element is displayed. Further, in accordance with the level, the font sizes, the style and the color can be changed.

Figure 10:
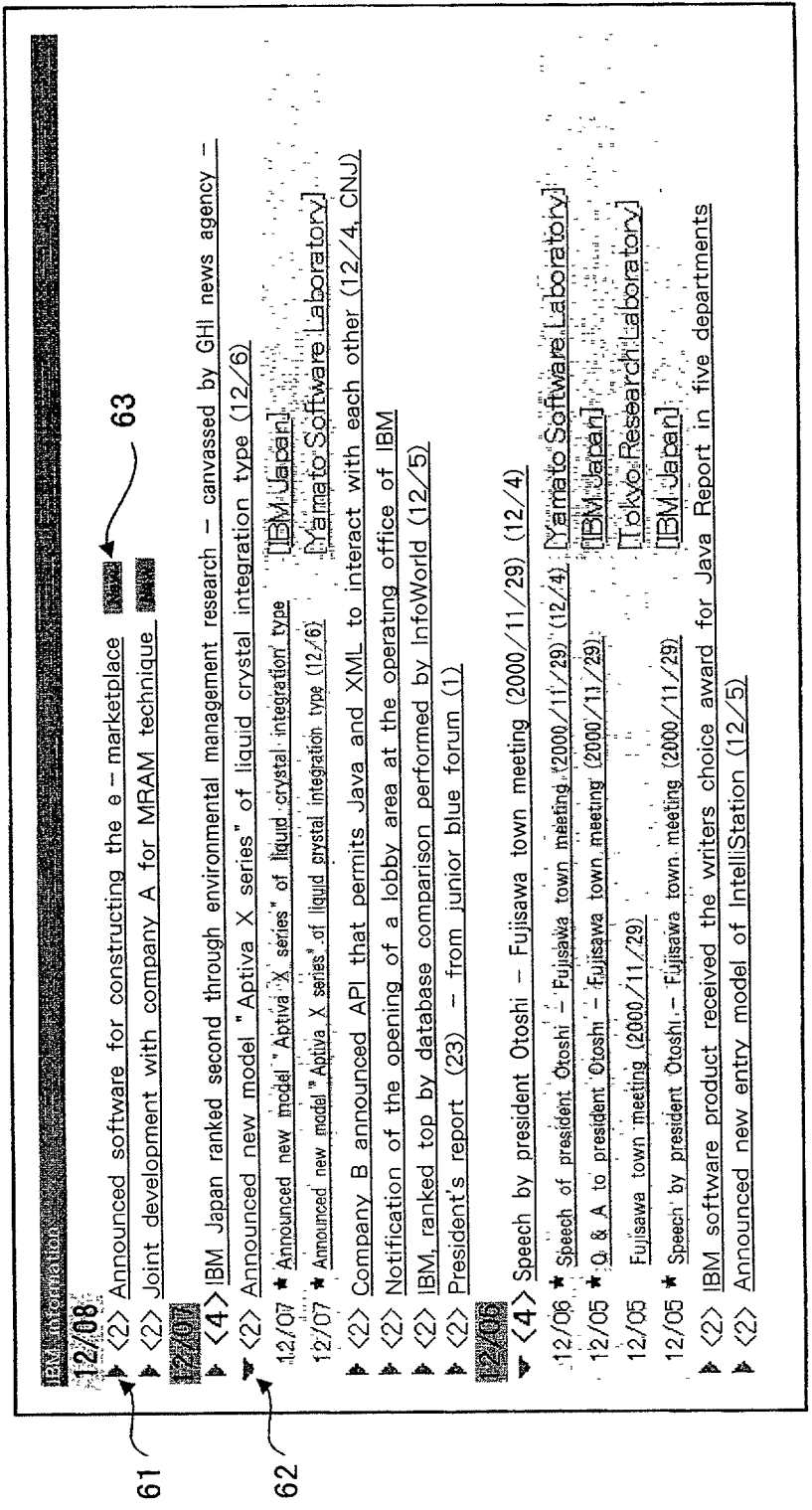
FIG. 10 is a diagram showing an example display for sets of sentence-level important information elements.

FIG. 10 is a diagram showing an example display for the sentence-level important information element sets. In this example, the sentence-level important information element sets are displayed in the descending order of their importance levels in accordance with the date (the descending order). When a right pointing triangular symbol 61 on a page is clicked on, relevant concealed information is unhidden and displayed. And when a downward pointing triangular symbol 62 is clicked on, displayed information is hidden. In FIG. 10, the closed state and the state wherein the information for the relevant site is displayed are shown. The number of information items that are folded is written at the head of each title, and those titles that represent greater numbers of information items and are regarded as being more important are ranked and positioned higher. For the display of the titles of information that it is assumed is important (e.g., the first information entries for December 6 and December 7), an enlarged character font is used, and for the display of a link that appeared on the date of the analysis (December 8), a special background color can be used. Further, adjacent to all the information elements that are added on the analysis date, a NEW symbol 63 is displayed.

FIG. 11 is a diagram showing an example sentence-level important information element set display to which an index has been added. In FIG. 11, an index 65, which uses a topic keyword, has been added to the sentence-level important information element set display shown in FIG. 10. In this example, the frequency and the keywords extracted from the headlines are indicated in the index 65, which is displayed at the head, and the current topic is clearly displayed. In this example, during a period extending from December 6 to December 8, for the topic keyword "announce" there were four cases; for "IBM", three; for "president", two; and for "software", two.

FIG. 12 is a diagram showing an example wherein only the headlines that include a keyword are displayed by selecting one of the topic keyword 65 entries. In this example, of the topic keywords 65, the entry "president" 69 is selected, and headlines that do not include the selected entry are not displayed. Therefore, through a simple operation, a user can set up a display for the extraction only of desired important information, and can then read the site information without being distracted by the display of information other than the important information that is desired.

Figure 13:
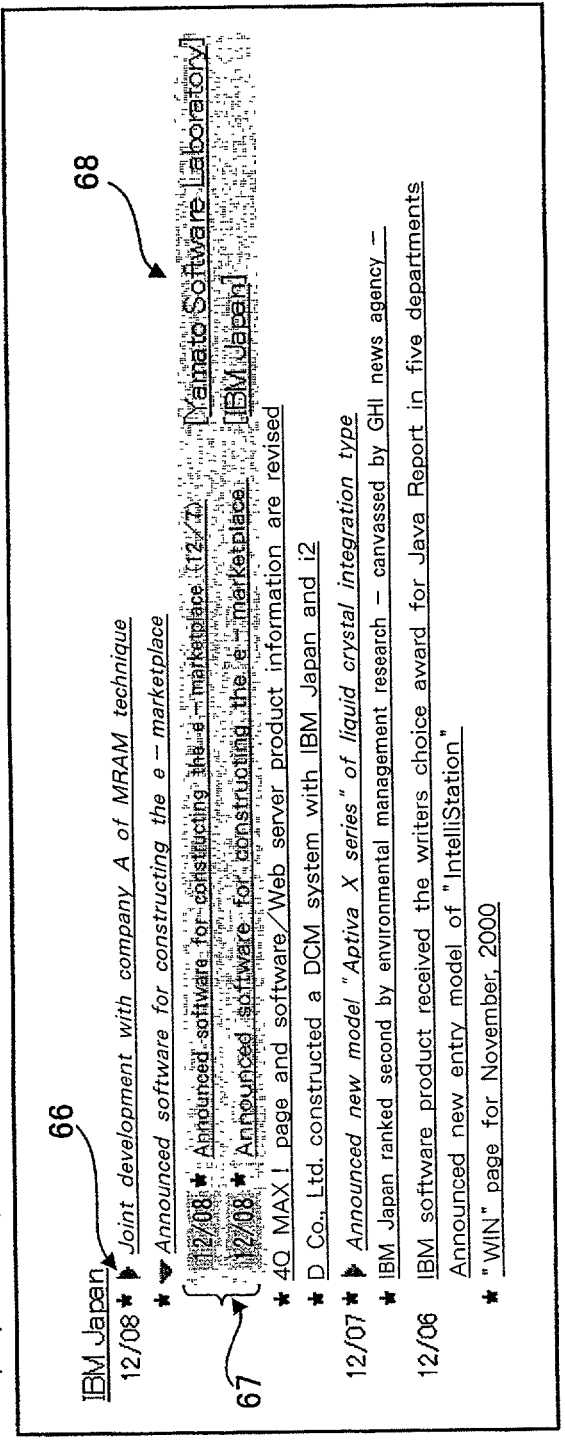
FIG. 13 is a diagram showing an example display for important information elements and relevant information at a single site.

FIG. 13 is a diagram showing an example display of important information elements and relevant information at a single site. In this example, important information and relevant information are displayed as a list of links. For example, among the newly arrived links for one site, "IBM Japan", information that is included in the sentence-level important information element sets that are extracted for the other site sets is regarded as important. Further, this important information is positioned at a higher display rank, and is highlighted by using a large or a gothic font style, for example, or by using a changed font. In addition, other information elements included in the same set are indicated by right pointing triangular symbols 66, and when one of these symbols 66 is clicked on, other site relevant information 67 is displayed. The extracted site name 68 is displayed in this other site relevant information 67. Then, while the other site relevant information 67 is displayed, when the user clicks on the down pointing triangular symbol next to the title the display is closed. Furthermore, the display order used for the information element sets can be changed, depending on the group of sites from which the information element set is obtained, and the font size and style can be altered in accordance with the relevant importance levels. In FIG. 13, beginning with the latest date, the links are displayed in the descending order of their importance levels; however, the links may also be displayed in the order wherein they were selected.

Although not shown, as in the display in FIG. 11, the topic keyword 65 extracted by the topic keyword extraction mechanism 34 is displayed for a single site, so that precisely the latest topic can be transmitted. For example, as in the display in FIG. 12, when a displayed word is selected or is not selected and a corresponding important information element set is displayed or is not displayed, this can help a user to understand which topic is the latest when many sets of sentence-level important information elements are displayed.

Figure 14:
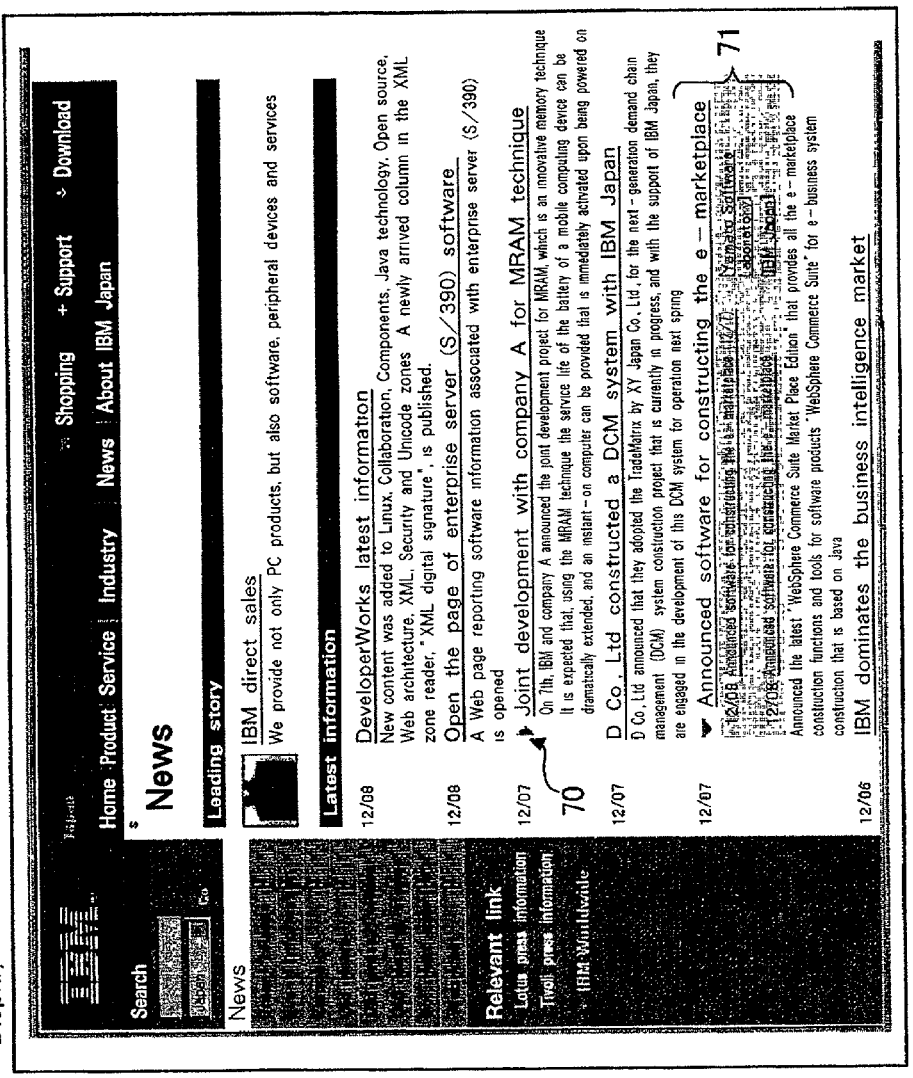
FIG. 14 is a diagram showing an example display for an arbitrary web page for which an annotation 70 has been performed.

FIG. 14 is a diagram showing an example display for an arbitrary web page for which annotation has been performed.

In this example, relevant information is displayed for the contents of one news site. In this embodiment, when the same information is referred to at another site, i.e., an important information element that conveys the same facts is present in another group of sites, an annotation 70, a remark, is automatically added to the original HTML file. Then, when the user selects the annotation 70, relevant information 71 from another site is displayed. With these functions, a site manager (content manager) can automatically provide additional information for the content he or she has prepared, so that a more abundant selection of information can be provided.

When a newly arrived link extracted by a PC is to be referred to and, as a handy information terminal, a PDA (Personal Digital Assistant) is being used, because of the PDA's display and memory sizes it would not be practical for all information at all destinations referred to by all links to be transmitted to the PDA. Therefore, it may be more efficient for merely a list of links to be transmitted to the PDA, whereat link selection could be made by browsing titles, while the actual browsing of the contents of a selected link would be performed at the PC. Further, it may be desirable at the PC that only links that have first been browsed be transmitted, and that later, after a link has been selected, all the contents of the selected link be read at one time. In this case, only those links that had been browsed would be displayed, and when a user clicked on a link, the contents could be read by a browser. Also, when displaying a selected link, by extracting and using important information elements, a more efficient environment could be provided by displaying only relevant information or by changing print fonts or styles.

When an annotation 70 is added for arbitrary text, matching of information elements extracted from a web page is performed by using the representative keyword for an extracted set of sentence-level important information elements, or information for designating an information source, such as a URL. When a specific matching level is obtained (whether or not information elements are matched, in the case of a URL), for the information elements, an annotation is provided as relevant information.

Figure 15:
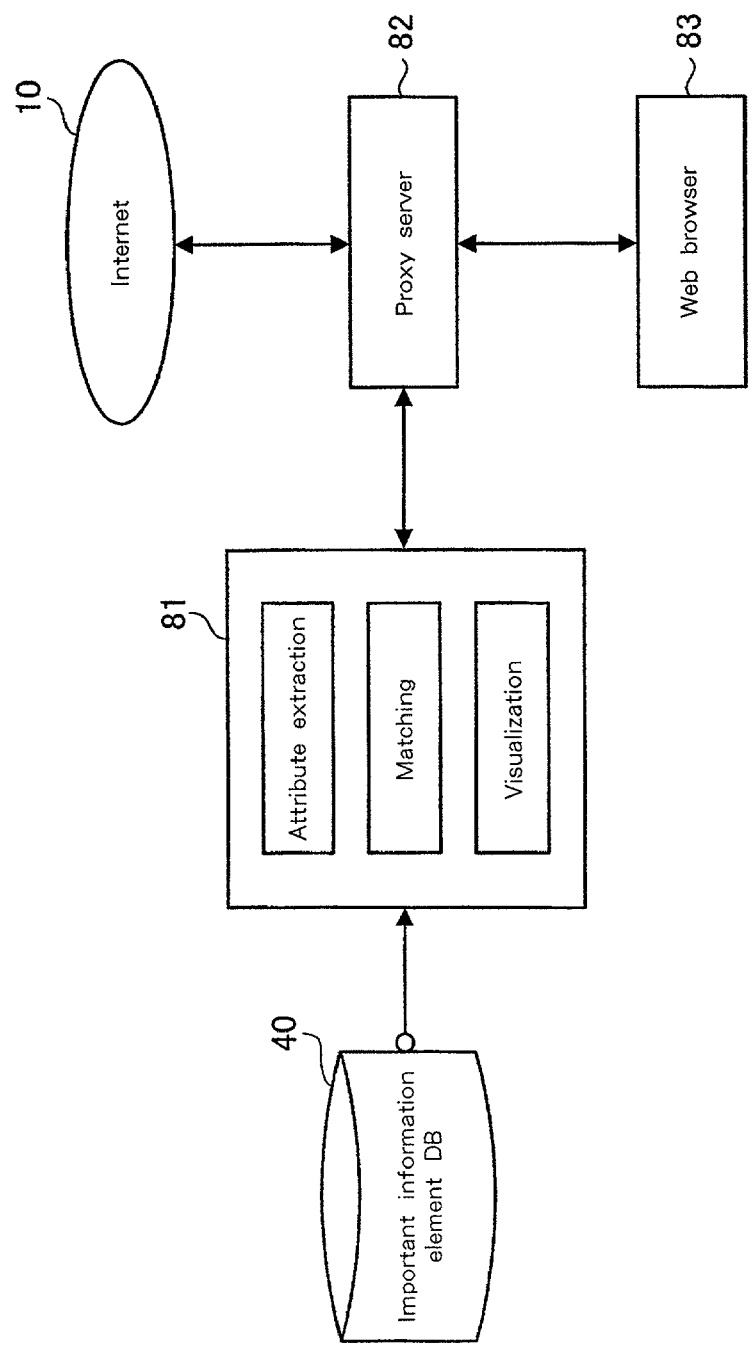
FIG. 15 is a diagram showing the overview of an annotation system for a web page.

FIG. 15 is a schematic diagram showing an annotation system for a web page. The annotation mechanism for a web page in FIG. 15 can be implemented by a proxy server 82. That is, when a web page received via the Internet 10 is to be displayed by a web browser 83, the web page is temporarily cached at the proxy server 82. At this time, a process mechanism 81 performs attribute extraction, matching and visualization for important information elements obtained from the important information element DB 40, and provides an annotation for the web page cached at the proxy server 82. Then, when the resultant web page is displayed, as in FIG. 13, by the web browser 83, a user can read the annotation that was added. At this time, when sets of important information elements are collected for individual fields, and the proxy server 82 automatically annotates these sets, a user can select an annotation corresponding to each field. Further, annotations can be added at the client side; or when a special software program, such as a word processor, is employed, annotations can be provided by a plug-in function.

As is described above, according to the embodiment, a user need only read important information selected from among that supplied by multiple sources. Assuming that in this embodiment the amount of data available for display is 100% of the total that can be acquired from all of the newly arrived links (785 links), if a summary is displayed with all relevant articles folded, the amount of data to be displayed would be reduced to that required for 47 headlines, for example, or only about 6% of the total available. And if the overview were displayed with all of the relevant articles opened, the displayed data would comprise 47 headlines+ 128 links, which would still be only about 22% of the total amount. Thus, compared with when all newly arrived links are displayed, a great reduction can be realized in the amount of data actually presented on a screen, while at the same time, all important information is available for display. As a result, user information acquisition efficiency is improved.

As is described above, according to the present invention, from information elements acquired by accessing multiple sites, important information elements can be extracted and presented visually.

The invention claimed is:

1. An information rearrangement method for rearranging information obtained from information sources connected via a network comprising: an information collection step of collecting information from a predetermined number of registered sites; an information element extraction step of extracting, from among said collected information, information elements that include the same facts that are referred to at multiple sites, said information element extraction step comprising selecting, from keywords of information elements included in one set, a keyword having an appearance rate that is equal to or greater than a threshold value, said keywords comprising words that are searchable, rankable, extractable, representations of information elements for determining the same facts included in the information elements, and chosen from the group consisting of anchors, links, text, nouns, predetermined proper nouns, and predetermined verbs; and a display step of displaying the contents of said extracted information elements while changing the display state of said contents in accordance with the number of sites whereat said facts are referred to; said step of displaying comprising extracting a set of important information elements on a sentence level from a group composed of a predetermined number of sites, and folding the display for the same sets of important information elements.

2. The information rearrangement method according to claim 1, wherein, at said information element extraction step, said information elements that convey the same facts are extracted together with a set of keywords that represent said information elements.

3. An information rearrangement method for rearranging information obtained from information sources connected via a network comprising: an information collection step of collecting information from a predetermined number of registered sites; an information element extraction step of extracting, from among said collected information, information elements that include the same facts that are referred to at multiple sites, said information element extraction step comprising selecting, from keywords of information elements included in one set, a keyword having an appearance rate that is equal to or greater than a threshold value, said keywords comprising words that are searchable, rankable, extractable, representations of information elements for determining the same facts included in the information elements, and chosen from the group consisting of anchors, links, text, nouns, predetermined proper nouns, and predetermined verbs; and a topic keyword extraction step of extracting a topic keyword that represents the entire set of information elements to be extracted; said topic keyword extraction step comprising a representative keyword extraction step, a set representative keyword extraction step, and a topic keyword collection step, and a display step of displaying the contents of said extracted information elements, while displaying said extracted topic keyword at a position different from the contents concerning said information elements.

4. The information rearrangement method according to claim 3, wherein, at said display step, when specific items are designated in said displayed topic keyword including multiple items, the contents concerning information elements that belong to a set of said specific items are displayed, and the contents concerning information elements that belong to a set of items that are not pertinent to said specific items are masked.

5. An information rearrangement method comprising the steps of: extracting information elements from multiple sites; said step of extracting information elements comprising selecting, from keywords of information elements included in one set, a keyword having an appearance rate that is equal to or greater than a threshold value, said keywords comprising words that are searchable, rankable, extractable, representations of information elements for determining the same facts included in the information elements, and chosen from the group consisting of anchors, links, text, nouns, predetermined proper nouns, and predetermined verbs; and determining whether, of said information elements extracted from said multiple sites, there are relevant information elements that convey the same facts as sentence-level information elements that constitute an arbitrary web page; and when said relevant information elements that include the same facts as said sentence-level information elements are present in said information elements obtained from said multiple sites, adding remark information to said sentence-level information elements to provide information concerning said arbitrary web page.

6. The information rearrangement method according to claim 5, wherein said web page with said added remark information is displayed, and said relevant information elements are displayed by designating said remark information.

7. A storage medium on which a computer-readable program is stored, which permits a computer to perform: a process for collecting information from a predetermined number of registered sites; a process for extracting, from among said collected information, information elements that include the same facts that are referred to at multiple sites said information element extraction process comprising selecting, from keywords of information elements included in one set, a keyword having an appearance rate that is equal to or greater than a threshold value, said keywords comprising words that are searchable, rankable, extractable, representations of information elements for determining the same facts included in the information elements, and chosen from the group consisting of anchors, links, text, nouns, predetermined proper nouns, and predetermined verbs; and a process for displaying the contents of said extracted information elements while changing the display state of said contents in accordance with the number of sites whereat said facts are referred to; said process for displaying comprising extracting a set of important information elements on a sentence level from a group composed of a predetermined number of sites, and folding the display for the same sets of important information elements.

8. A storage medium on which a computer-readable program is stored, which permits a computer to perform: a process for collecting information from a predetermined number of registered sites; a process for extracting, from among said collected information, information elements that include the same facts that are referred to at multiple sites, said information element extraction processing step comprising selecting, from keywords of information elements included in one set, a keyword having an appearance rate that is equal to or greater than a threshold value, said keywords comprising words that are searchable, rankable, extractable, representations of information elements for determining the same facts included in the information elements, and chosen from the group consisting of anchors, links, text, nouns, predetermined proper nouns, and predetermined verbs; a process for extracting a topic keyword that represents the entire set of information elements to be extracted; and a process for displaying the contents of said extracted information elements, while displaying said extracted topic keyword at a position different from the contents concerning said information elements.

* * * * *